(12) United States Patent
Brucker

(10) Patent No.: US 9,890,520 B2
(45) Date of Patent: Feb. 13, 2018

(54) WATER CAPTURE DEVICE FOR STORAGE AND DISTRIBUTION

(71) Applicant: DrainCube LLC, Olathe, KS (US)

(72) Inventor: David W. Brucker, Olathe, KS (US)

(73) Assignee: DrainCube LLC, Olathe, KS (US)

( * ) Notice: Subject to any disclaimer, the term of this patent is extended or adjusted under 35 U.S.C. 154(b) by 37 days.

(21) Appl. No.: 14/877,684

(22) Filed: Oct. 7, 2015

(65) Prior Publication Data

US 2016/0102446 A1 Apr. 14, 2016

Related U.S. Application Data

(60) Provisional application No. 62/061,396, filed on Oct. 8, 2014.

(51) Int. Cl.
*E03B 3/03* (2006.01)

(52) U.S. Cl.
CPC ...................... *E03B 3/03* (2013.01)

(58) Field of Classification Search
CPC ......... Y10T 137/6969; Y10T 137/6973; Y10T 137/698; E03B 3/02–3/03
USPC ............... 137/357, 358, 360; 220/3.3; 52/16
See application file for complete search history.

(56) References Cited

U.S. PATENT DOCUMENTS

| | | | | |
|---|---|---|---|---|
| 4,219,428 A * | 8/1980 | Soderstroom | ............. | E03B 3/03 210/522 |
| 4,386,484 A * | 6/1983 | van Berne | ................ | E03B 3/03 405/119 |
| 4,726,151 A * | 2/1988 | Vitale | ........................ | E03B 3/02 285/325 |
| 5,533,303 A * | 7/1996 | Harvey | ...................... | E03B 3/02 137/357 |
| 5,730,179 A * | 3/1998 | Taylor | ....................... | E03B 3/03 137/357 |
| 5,878,694 A * | 3/1999 | Irwin | .................... | A01K 63/003 119/246 |
| 6,182,680 B1 * | 2/2001 | Hart | .......................... | E03B 3/03 137/122 |
| 8,397,746 B1 * | 3/2013 | Taborek | .................. | E04D 13/08 137/357 |
| 2005/0109693 A1 * | 5/2005 | Allard | ..................... | B01D 35/02 210/446 |
| 2009/0065072 A1 * | 3/2009 | Adamson | .................. | E03B 3/02 137/357 |

* cited by examiner

*Primary Examiner* — Mary McManmon
*Assistant Examiner* — Nicole Gardner
(74) *Attorney, Agent, or Firm* — Erise IP, P.A.

(57) ABSTRACT

A water capture device for installing in an elevated location on a building. The water capture device comprises a plurality of exterior walls, an input opening, a main chamber, a release opening, an overflow channel, and an overflow opening. The plurality of exterior walls defines a cavity. The input opening allows for allowing water to enter the cavity. The main chamber is within the cavity configured to fill with water. The release opening is for selectively releasing water from the main chamber for use by a user. The overflow channel within the cavity is for receiving excess water from the main chamber that rises above a threshold associated with the overflow channel. The first overflow opening is for allowing excess water within the overflow channel to freely exit the water capture device.

18 Claims, 8 Drawing Sheets

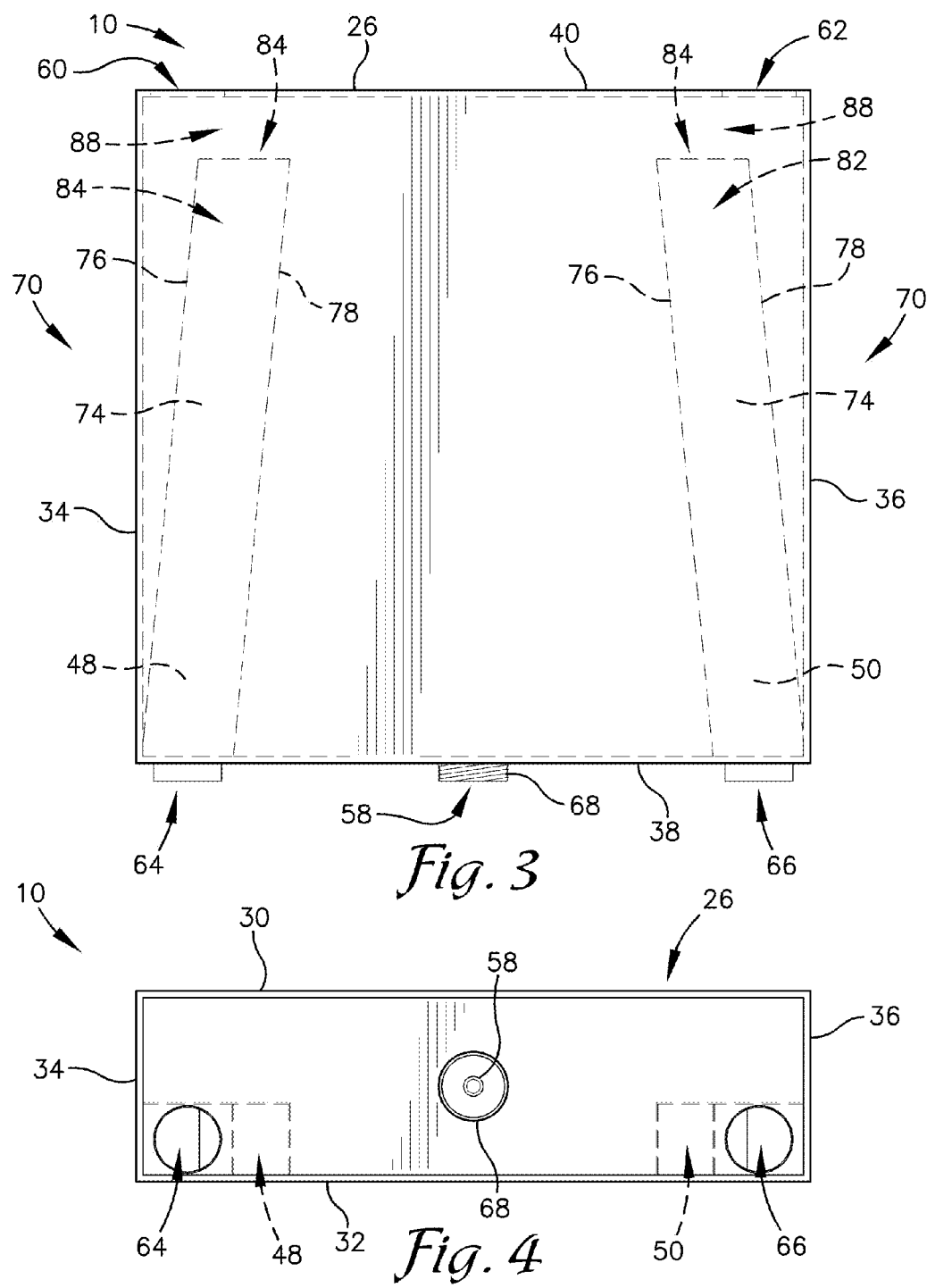

WATER CAPTURE DEVICE FOR STORAGE AND DISTRIBUTION

RELATED APPLICATIONS

This non-provisional patent application claims priority benefit, with regard to all common subject matter, of earlier-filed U.S. Provisional Patent Application No. 62/061,396, filed on Oct. 8, 2014, and entitled "WATER CAPTURE DEVICE FOR STORAGE AND DISTRIBUTION." The identified earlier-filed provisional patent application is hereby incorporated by reference in its entirety into the present application.

BACKGROUND

1. Field

Embodiments of the invention broadly provide an apparatus, system, and method for excess water capture and distribution. More specifically, embodiments of the invention broadly provide a water capture device for being secured in an elevated location on a building.

2. Related Art

Excess water capture devices, such as rainwater capture devices, are used to capture and store the water for later use. Generally, water capture devices are placed on the ground next to a building and receive water via the building's drainage system (i.e., down spout, gutters, etc.). The stored water may then be withdrawn from a spigot located on the side of the water capture device.

An exemplary known water capture device is a rain barrel, that is usually a large drum positioned next to the building so as to receive water from the drainage system of the building. Typically, a rain barrel is placed below a downspout so as to receive the water therefrom.

Current devices present several problems. First, the side-mounted spigot does not allow for complete drainage of water out of the water capture device. In instances where the water capture device comprises a barrel, for example, the spigot is normally mounted a few inches above a bottom of the barrel to allow access to the spigot. Consequently, water will accumulate below the release point of the spigot. Another problem relates to the pressure of drawing the water. Without mounting a separate pump, existing devices only have enough pressure to empty the water into a bucket below the water line, spigot, or distribute the water a limited distance downhill through a garden hose. Another problem relates to regulating the overflow once the water capture device has reached its capacity. Generally once it reaches its capacity, the over-flow will spill over the top and around the device onto the ground. Hence, it is difficult to manage the overflow or even integrate the water capture device into a building's drainage system. Further, water capture devices generally present standing water that can be a breeding ground for insects. The water capture devices are susceptible to being clogged with debris because there is no easy way to clean them.

SUMMARY

Embodiments of the invention address these problems in several ways. Embodiments of the invention elevate the water capture device and secure it to the building. Embodiments of the invention provide a water capture device that releases the water through a release opening located on a bottom of the device, which allows the water capture device to completely drain the fluid it contains. Second, embodiments of the invention allow for the water capture device to be mounted to a side of the building, which utilizes the force of gravity to provide a greater water pressure. With a greater water pressure comes a greater ability to distribute the captured water a greater distance. The water capture device of embodiments also helps regulate the overflow and can discharge the water back into a building's drainage system (e.g., gutters, downspout, etc.). Moreover, the water capture device is customizable at the point of installation according to the building's drainage system. The water capture device is totally or substantially enclosed so as to reduce the likelihood of insect reproduction therein. Finally, the water capture device is self-cleaning so as to remove a majority of the debris automatically.

As a building's drainage system collects rainwater, it diverts the water to an input opening of the device. The water then accumulates in the water capture device until the water capture device eventually reaches its maximum volume capacity. Upon reaching full capacity, the water spills over into an overflow channel and out an overflow opening at the bottom of the water capture device, can then expel the water and debris back into the building's drainage system or be diverted away by a separate drainage system. Water retained in the water capture device may then be selectively utilized for various functions.

A first embodiment of the invention is directed to a water capture device. The water capture device comprises a plurality of exterior walls, an input opening, a main chamber, a release opening, an overflow channel, and an overflow opening. The plurality of exterior walls defines a cavity. The input opening allows for allowing water to enter the cavity. The main chamber is within the cavity configured to fill with water. The release opening is for selectively releasing water from the main chamber for use by a user. The overflow channel within the cavity is for receiving excess water from the main chamber that rises above a threshold associated with the overflow channel. The first overflow opening is for allowing water within the overflow channel to freely exit the water capture device.

A second embodiment of the invention is directed to a water capture system configured to be installed on a drainage system of a building. The water capture system comprising an input downspout, a water capture device, an overflow downspout, and a release pipe. The input downspout is configured to receive water from the drainage system. The water capture device for receiving water from the input downspout. The water capture device is installed in an elevated position on the building and retains the received water within a main chamber for later use. The overflow downspout allows excess water from the main chamber to exit the water capture device and continue to drain from the building. The release pipe selectively releases the water stored in the water capture device.

A third embodiment of the invention is directed to a method of collecting and utilizing water, the method comprising the following steps: installing a water capture device in an elevated location on a building; directing water into the water capture device via a drainage system of the building; directing overflow water from the water capture device to continue to drain from the building; and providing a release pipe such that a user may selectively utilize water stored in the water capture device from ground level.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein:

FIG. 3 is a front view of the embodiment of the invention illustrated in FIG. 2;

FIG. 4 is a bottom view of the embodiment of the invention illustrated in FIG. 2;

Figure 1:
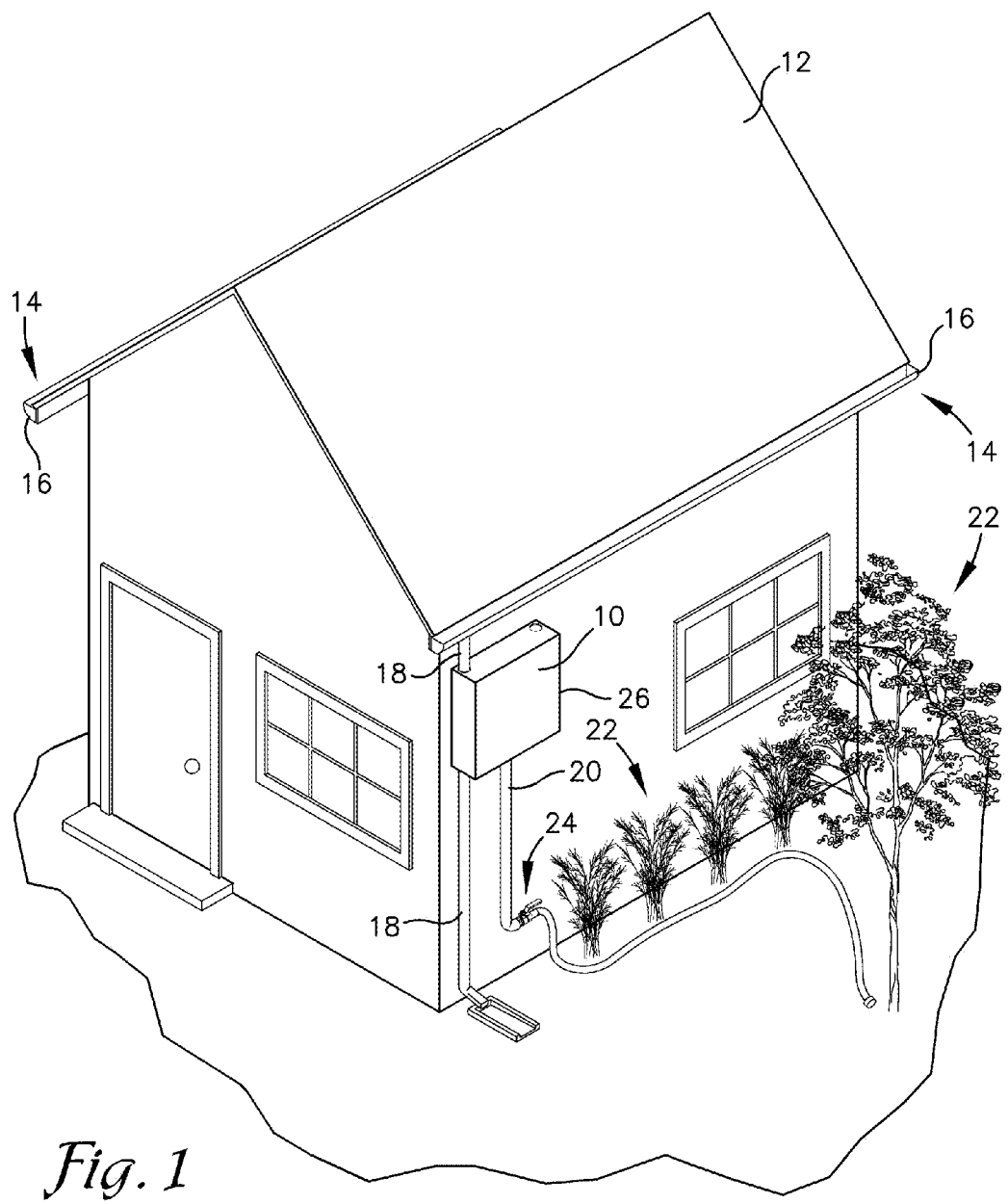
FIG. 1 is an environmental view of an exemplary building having a water capture device installed into a drainage system of the building.

The drawing figures do not limit the embodiments of the invention disclosed and described herein. The drawings are not necessarily to scale, emphasis instead being placed upon clearly illustrating various features of embodiments of the invention.

DETAILED DESCRIPTION

The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

As illustrated in FIG. 1, a water capture device 10 is configured to be secured to a building 12, such as a dwelling. As illustrated in FIG. 1, the water capture device 10 is typically elevated off the ground level, so as to utilize the potential energy associated with retaining the water above ground level and the resulting kinetic energy from allowing the water to fall to ground level as discussed below. The water capture device 10 is configured to interface with a drainage system 14, which may include a gutter 16 and a downspout 18. The gutter 16 directs water toward the downspout 18, such that the downspout 18 will allow the water to flow down and away from the building. In embodiments of the invention, the water capture device 10 will be installed between an input downspout (i.e. upper portion) and an overflow downspout (i.e. lower portion). As explained below, excess water beyond the storage capacity of the water capture device 10 is expelled through the overflow downspout. A release pipe 20 is installed so as to allow an operator to utilize the stored water for various watering functions, such as the feeding of plants 22. The release pipe 20 may include a spigot 24 or other selective closing structure to allow the operator the convenient ability to release the water stored therein from the ground level.

It should be appreciated that the use of the water capture device 10 on the side of a dwelling as shown in FIG. 1 is only an exemplary field of use. Embodiments of the invention are configured to be used in conjunction with a commercial or industrial building 12 to capture water from the drainage systems 14 of such building 12. Other embodiments of the invention are configured to be used in conjunction with a dam or a river. The water capture devices 10 of these embodiments are adapted to capture a portion of water that is passing by them, such as over the spillway of a dam. Still other embodiments of the invention are designed to capture snow that is then heated into water that is retained in the water capture device 10.

In some embodiments, the water is utilized for numerous purposes alternatively to watering plants 22, as discussed above. Some embodiments of the invention are configured to utilize the captured water for drinking purposes (such as for pets). The water may also be utilized for other household purposes such as washing clothes, flushing toilets, etc. Still other embodiments of the invention are configured to utilized the captured water for industrial purposes such as cooling machinery or cleaning surfaces.

The components of the water capture device 10 will now be discussed in more detail. The water capture device 10 as discussed herein, and illustrated in the drawings, are typically configured for installation on the dwelling. As such, embodiments of the invention illustrated in the drawings are generally directed toward the water capture devices 10 presenting a narrow profile so as to provide a minimalistic look from the exterior and to minimize the torque imparted on the dwelling by the weight of the water retained within the water capture device 10.

Figure 2:
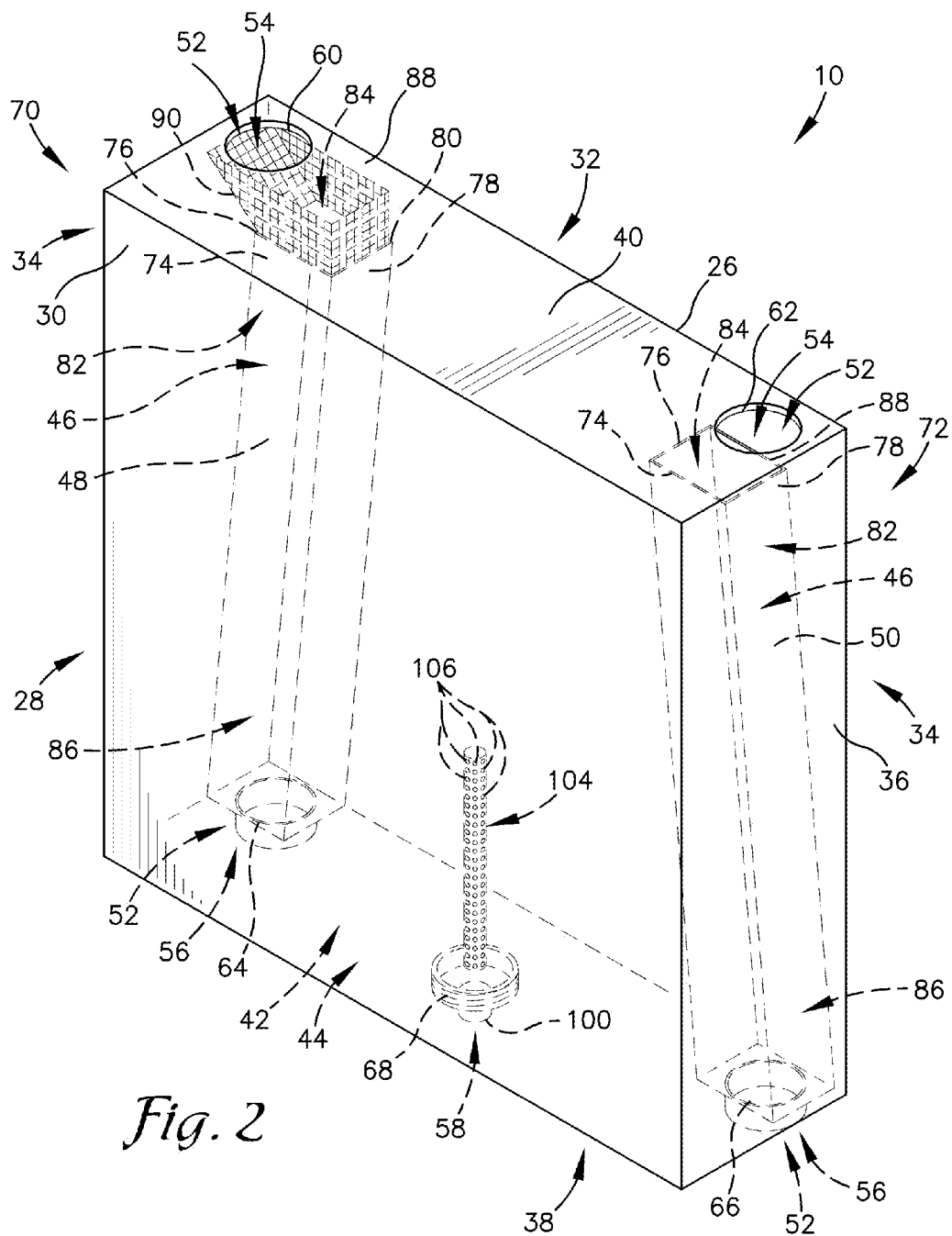
FIG. 2 is a perspective view of one embodiment of the invention, characterized by substantially linear overflow channels therein.

The water capture device 10 broadly comprises a body 26. The body 26 includes a plurality of exterior walls 28. In embodiments of the invention, such as illustrated in FIG. 2, the plurality of exterior walls 28 includes a front wall 30, a rear wall 32, a left wall 34, a right wall 36, a bottom wall 38, and a top wall 40. The plurality of exterior walls 28 define a cavity 42 therein. The cavity 42 is the void within the plurality of exterior walls 28. As illustrated in FIG. 2, the body 26 of embodiments of the invention is the shape of a rectangular prism. In other embodiments of the invention, the body 26 presents another shape, such as a cylinder, a semi-cylinder, a trapezoidal prism, etc. While numerous body 26 shapes are possible, typically at least one of the plurality of exterior walls 28 will be substantially flat for mounting to the building 12. Further, in some embodiments one of the exterior walls 28 is removable to aid in installation and cleaning of the device.

The cavity 42 includes a main chamber 44 and at least one overflow channel 46. The main chamber 44 is configured to receive a volume of water. A first overflow channel 48 and a second overflow channel 50 are positioned within the interior of the body 26 to receive any excess water from the main chamber 44 and dispose of the excess water via the drainage system 14.

Figure 5:
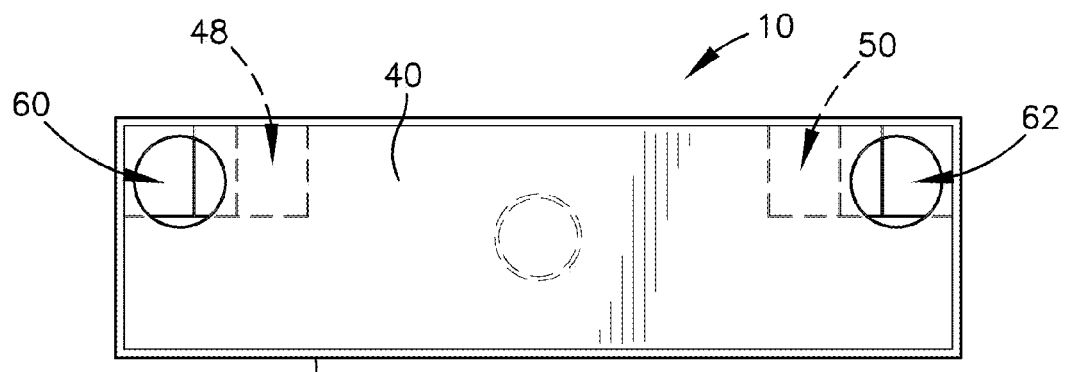
FIG. 5 is a top view of the embodiment of the invention illustrated in FIG. 2.
Figure 6:
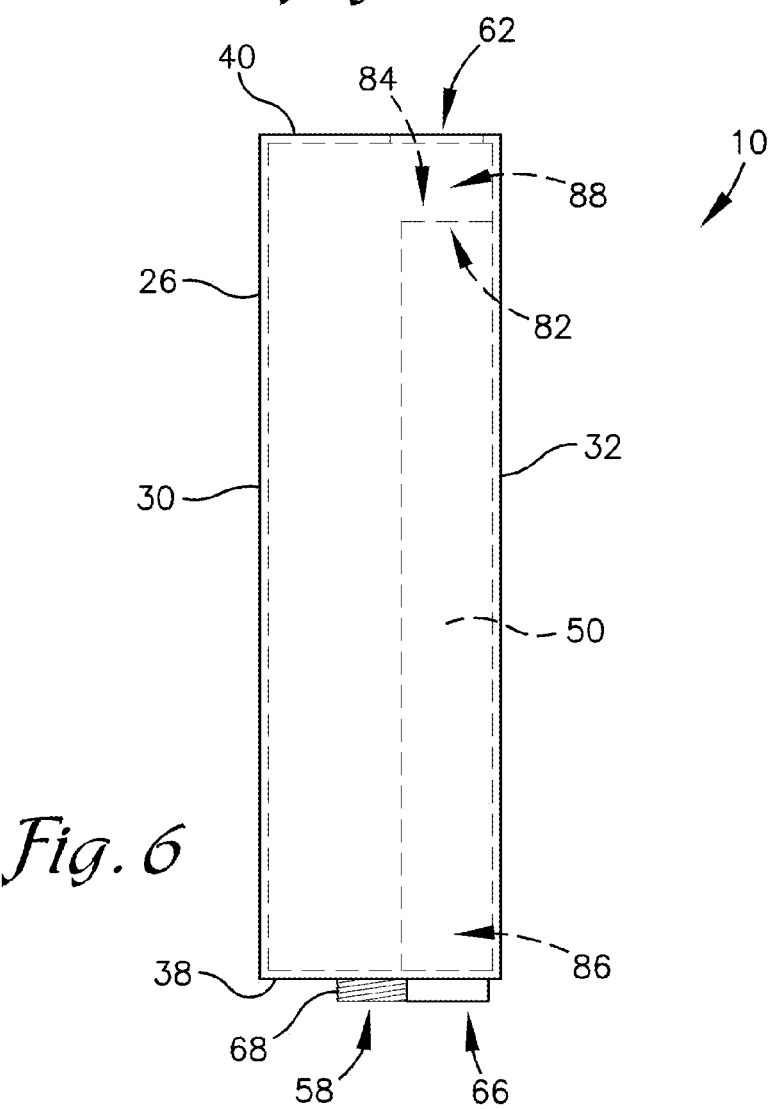
FIG. 6 is a side view of the embodiment of the invention illustrated in FIG. 2.
Figure 7:
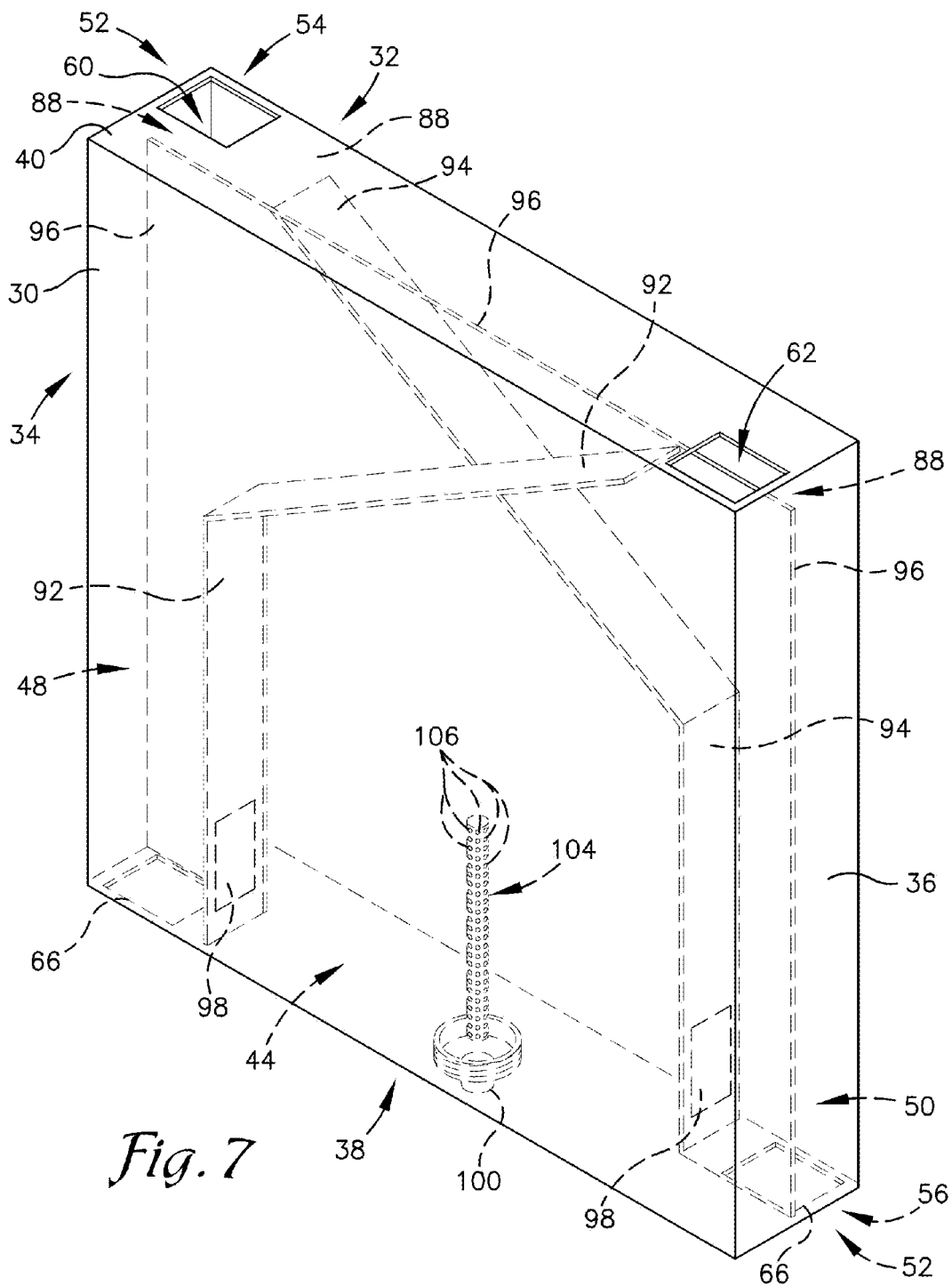
FIG. 7 is a perspective view of another embodiment of the invention, characterized by beveled overflow channels.
Figure 8:
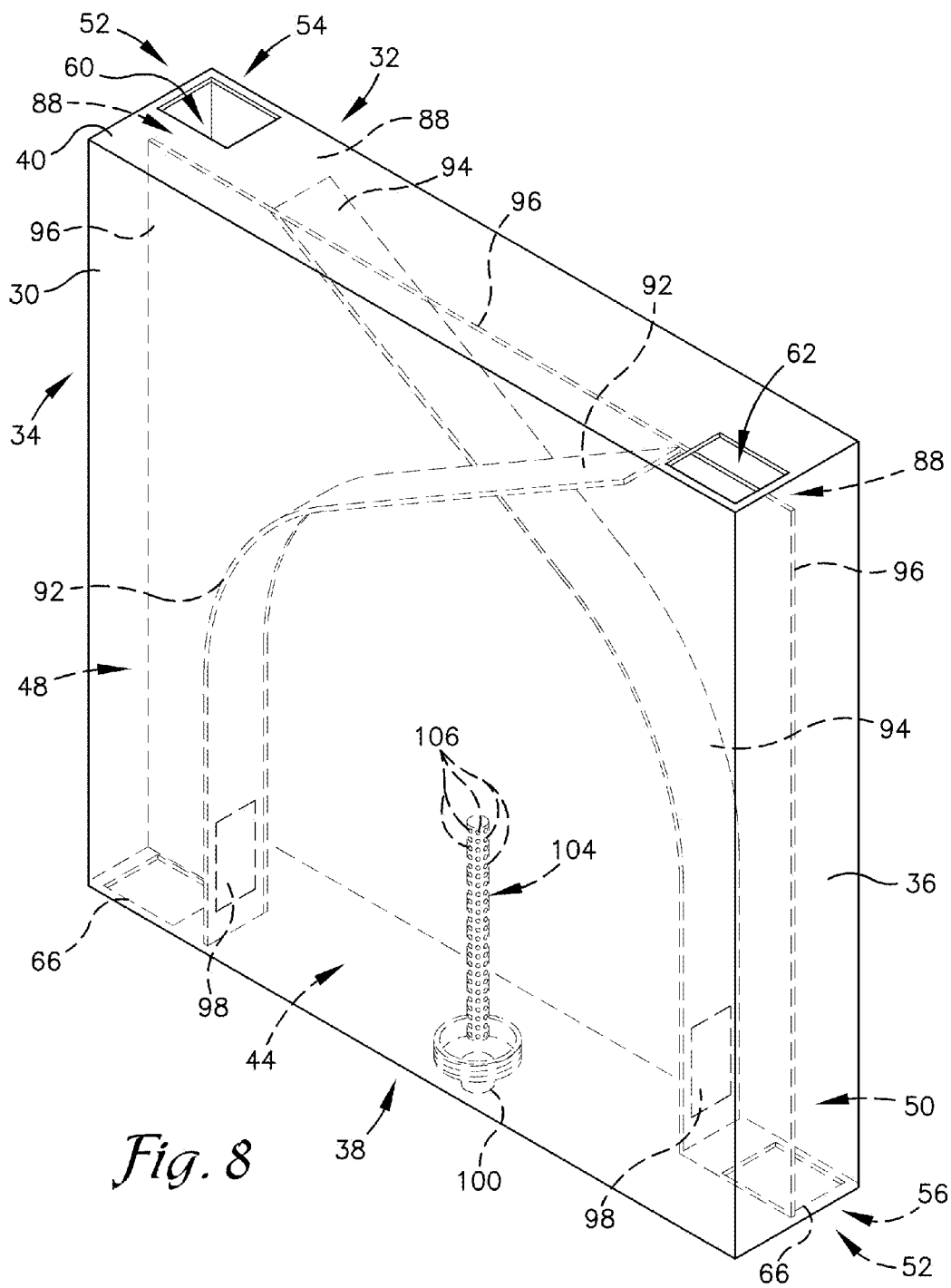
FIG. 8 is a perspective view of yet another embodiment of the invention, characterized by arcuate overflow channels.
Figure 9:
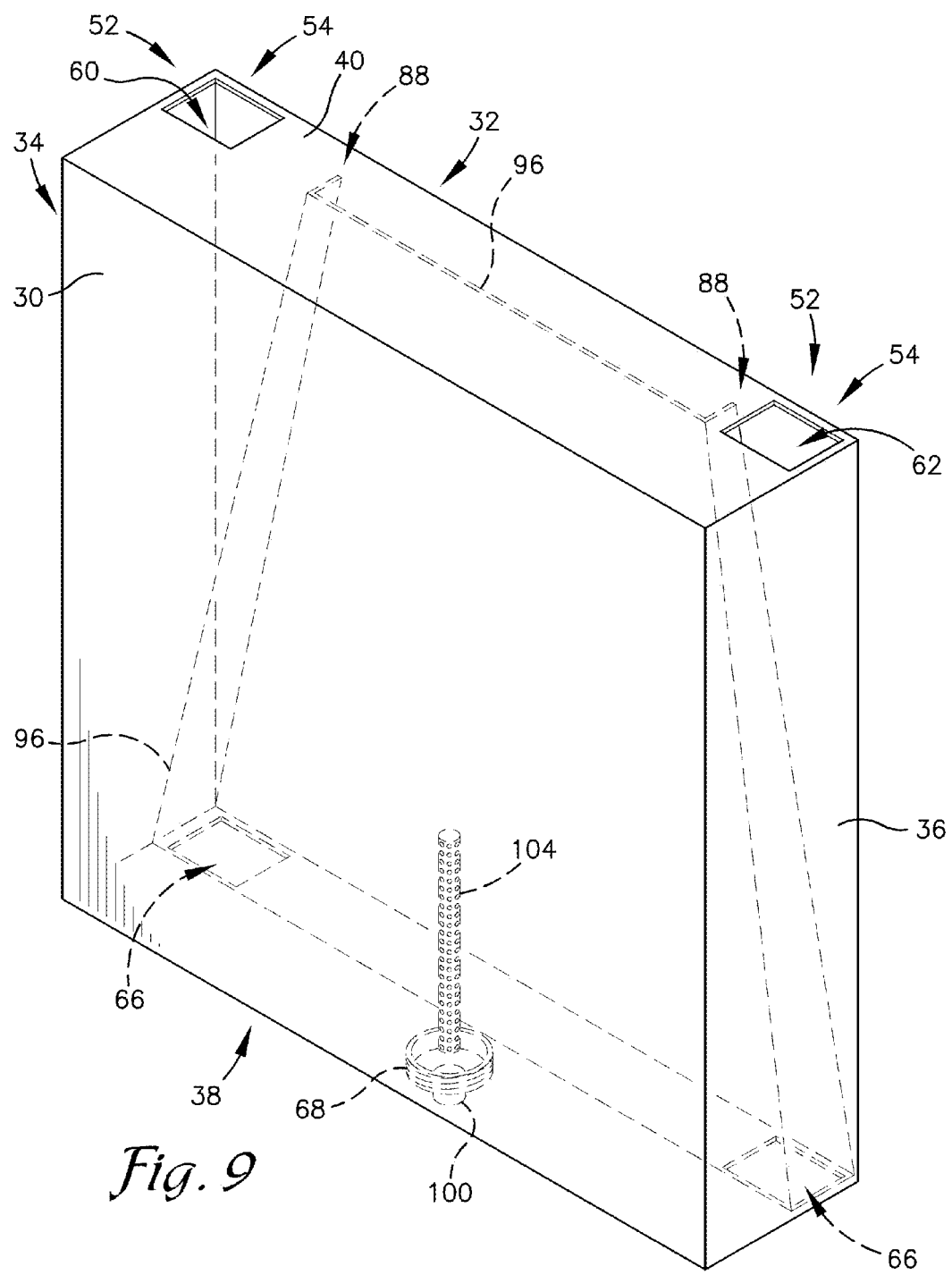
FIG. 9 is a perspective view of yet a further embodiment of the invention, characterized by a single overflow channel.

A plurality of openings 52 allow water to enter and exit the water capture device 10. The plurality of openings 52 broadly comprises at least one input opening 54, at least one overflow opening 56, and a release opening 58. In embodiments of the invention, the plurality of openings 52 further includes a first input opening 60, a second input opening 62, a first overflow opening 64, and a second overflow opening 66. The plurality of openings 52 may also include one or more access ports 68. The various openings 52 may be of numerous sizes and shapes. As illustrated in FIGS. 7-9 the input openings 54 and the overflow openings 56 may be substantially rectangular. As illustrated in FIGS. 2 and 4-5 the input openings 54 and overflow openings 56 may be circular. The shape of the input openings 54 and overflow opening 56 may depend on the size and shape of the drainage system 14 and any applicable adapter.

In embodiments of the invention, the water capture device 10 is generally symmetrical. In some embodiments, such as illustrated in FIGS. 2 and 9, the general symmetry is linear symmetry (i.e. the same mirrored to the left and right). In other embodiments, such as illustrated in FIGS. 7 and 8, the general symmetry is rotational (i.e. the same upon 180 degree rotation about a vertical central axis). The general symmetry allows embodiments of the invention to be installed in either a left configuration (as illustrated in FIG. 1) or a right configuration (not illustrated). As can be appreciated in FIG. 1, the downspout 18 of the drainage system 14 is at or near corners of the building 12. As such, depending on the configuration of the building 12 and the drainage system 14 into which the water capture device 10 is being installed, it would be advantageous to have the water capture device 10 accept an input of water on either side. This allows manufacturers and suppliers of the water capture device 10 to only produce and stock a single version of the water capture device 10 that is adaptable to be installed into either of a left configuration or a right configuration. In other embodiments of the invention, not illustrated, the water capture device 10 is configured to be placed into only the left configuration or the right configuration.

In embodiments of the invention, the water capture device 10 is generally designed symmetrically, such that a left side 70 of the device includes the first overflow channel 48, the first input opening 60, and the first overflow opening 64. Similarly, a right side 72 of the device includes the second overflow channel 50, the second input opening 62, and the second overflow opening 66.

The body 26 of the water capture device 10 is designed to be mounted to the drainage system 14 in one of two orientations. In both orientations, the rear wall 32 of the body 26 is facing the building 12, and the front wall 30 of the body 26 is facing out to the environment. Similarly, the top wall 40 is facing vertically upwards, and the bottom wall 38 is facing vertically downwards towards the ground. In the left orientation, the body 26 is connected to the building 12 in a general left-hand side of the body 26 and, in particular, via the first input opening 60. Conversely, in the right orientation, the body 26 is connected to the drainage system 14 on a general right-hand side of the body 26 and, in particular, via the second input opening 62.

In more detail, the body 26 of the water capture device 10 is configured to be mounted on the building 12 and intersect the downspout 18 of the drainage system 14. In embodiments of the invention, a length of an existing downspout running along the side of the building 12 will be removed during installation. The removed length of the downspout 18 is substantially the same as a height of the body 26 of the water capture device 10. The input downspout is then fluidly connected to either input opening 54, depending on where the water capture device 10 is desired to be mounted on the building 12 (i.e. in the left configuration or the right configuration, as discussed above). Thus, the input openings 54 are located through the top wall 40 of the body 26 and serve to receive water from the drainage system 14 of the building 12. Similarly, the overflow downspout will be reconnected with the respective overflow opening 56, which are located through the bottom wall 38 of the body 26 and serve to discharge excess rainwater. In other embodiments of the invention, the downspout 18 is left substantially intact, but water is diverting into the water capture device 10 from the downspout 18 and the excess is returned to the downspout 18.

In embodiments of the invention, the main chamber 44 is configured to store water for possible later utilization by a user. The main chamber 44 may comprise at least 60 percent, at least 80 percent, or at least 90 percent of the total volume of the cavity 42 of the water capture device 10. The main chamber 44 is formed within the body 26 of the water capture device 10 (i.e. the top wall 40, the bottom wall 38, the front wall 30, the rear wall 32, the right wall 36, and the left wall 34), excluding the at least one overflow channel 46. As water falls from the input downspout and through either input opening 54, it collects along the bottom wall 38. As water continues to collect, the water level rises until reaching a maximum level at which point any water that still collects will cause excess water to spill over into the overflow channel 46.

The overflow channels 46 will now be discussed. As can be noted from the drawings, there are numerous embodiments that incorporate varying layouts of the overflow channel 46. Exemplary overflow channels 46 include tubular channel embodiments (as illustrated in FIGS. 2-3), crossing dual channel embodiments (as illustrated in FIGS. 7-8), and single channel embodiments (as illustrated in FIG. 9). Each of these embodiments is discussed in detail below. It should be appreciated that other embodiments of the overflow channels 46 may be possible, but are within the scope of the invention.

In some embodiments of the invention, the first overflow channel 48 and the second overflow channel 50 are substantially tubular. In embodiments, the tubular first overflow channel 48 and second overflow channel 50 present a substantial square shape about a horizontal cross-section. The tubular overflow channels 46 present a front wall 74, a left wall 76, a right wall 78, and a back wall 80. The tubular overflow channels 46 are open at a top end 82 (presenting a void 84) and are open at a bottom end 86 (collocated with or proximate to the overflow opening 56. The tubular overflow channels 46 present a gap 88 between the upper end and the top wall 40 of the body 26. The gap 88 allows water to pass over the upper end and pass into the overflow channels 46. These embodiments may present various benefits such as easy of manufacture and a reduced volume of the overflow channels 46 (which correlates to a proportionally larger volume for the main chamber 44). In other embodiments of the invention, not illustrated, the tubular first overflow channel 48 and second overflow channel 50 present a substantial circular shape about a horizontal cross-section, or another shape.

In embodiments of the invention, as illustrated in FIGS. 2-3, the tubular overflow channels 46 are canted such that the various walls of the overflow channel 46 are not parallel with the walls of the body 26. This allows at least a portion of the water entering through the input opening 54 to fall past the gap 88 of the overflow channel 46 and enter the main chamber 44. This is because it is advantageous in the installation into existing drainage systems 14 that the input opening 54 and the overflow opening 56 be aligned (discussed above). As such, the canted overflow channels allow water to fill the main chamber 44 before flowing into the overflow channel 46.

As illustrated in FIGS. 2 and 3, the overflow channels 46 may be canted inward, i.e. toward the center of the water capture device 10. In other embodiments, not illustrated, the overflow channels 46 may be canted forward. In still other embodiments, overflow channels 46 may present another shape while being substantially tubular. In one embodiment, the overflow channels 46 present a stepped shape. In another embodiment, the overflow channels 46 include an S-curve. In yet another embodiment, the overflow channels 46 present an elbow at the top end 82 so as to prevent water flowing through the input opening 54 from flowing directly into the overflow channel 46.

In embodiments of the invention, the input opening 54 includes a filter sleeve 90, as illustrated only in FIG. 2 for clarity. The filter sleeve 90 extends from the input opening 54 to the corresponding overflow channel 46. The filter sleeve 90 directs the flow of debris through the water capture device 10, so as to prevent clogging and accumulation of debris within the main chamber 44. The filter sleeve 90 is a flexible tube that is directed from the input opening 54 to the overflow channel 46. The filter sleeve 90 allows at least a portion of the water entering the water capture device 10 to pass through the filter sleeve 90 and enter the main chamber 44. Debris entering the water capture device 10, such as via the drainage system 14 of the building 12, is directed toward the overflow channel 46 and then to the overflow opening 56. Thus, a relatively high percentage of the debris that enters through the input opening 54 is expelled through the overflow opening 56 without ever entering the main chamber 44.

It should also be appreciated that because most of the water entering the filter sleeve 90 will pass through the filter sleeve 90, it is common for debris to remain in the filter sleeve 90 until pushed therethrough by water. Debris becoming stuck in the filter sleeve 90 is of little consequence; however, because the debris may remain in the filter sleeve 90 until later pushed through by water. This prevents most debris accumulation in the main chamber 44.

Further, in embodiments of the invention that utilize the filter sleeve 90, it should be appreciated that a portion of the water entering the input opening 54 will pass via the filter sleeve 90 directly out of the overflow opening 56. As such, only a portion of the water entering the input opening 54 will pass into the main chamber 44. This is also of little consequence due to the large amount of water that will typically pass through the input opening 54. For example, a 1,000 square foot roof receiving an inch of rainfall will receive approximately 600 gallons of water. The water capture device 10 will, in embodiments of the invention, hold far less than 600 gallons (such as at least 30 gallons, at least 50 gallons, at least 80 gallons, at least 100 gallons, etc.). The water capture device 10 will therefore receive adequate water to fill the main chamber 44 even if allowing a portion of the water entering the input opening 54 to pass directly to the overflow opening 56. While the drawings only depict the filter sleeve 90 in FIG. 2, it should be appreciated that the other various embodiments herein discussed may also include a filter sleeve.

In other embodiments of the invention, the overflow channels 46 are built into the walls of the body 26, such as in the crossing dual channels embodiments as illustrated in FIGS. 7 and 8. In these embodiments, the overflow channels 46 are formed by a first interior channel wall 92, a second interior channel wall 94, an overflow wall 96, and the body 26 (i.e., the rear wall 32, the bottom wall 38, and the respective left wall 34 or right wall 36 of the body 26). As shown in FIGS. 7 and 8, the overflow wall 96 of the overflow channels 46 coincide with one other and extends upwards to the top wall 40 of the body 26. Referring to FIGS. 7 and 8, for the first overflow channel 48 (i.e., the channel on the left-hand side of the body 26), the first interior channel wall 92 extends upwards from the second overflow opening 66 (i.e., the overflow opening 56 on the left-hand side of the body 26), up the left wall 34 across a portion of the width of the front wall 30. Similarly, for the second overflow channel 50 (i.e., the channel on the right-hand side of the body 26), the second interior channel wall 94 extends upwards from the first overflow opening 64 (i.e., the overflow opening 56 on the right-hand side of the body 26), up the right wall 36, and across a portion of the width of the rear wall 32.

In some embodiments of the invention, the interior channel walls are angled. In one embodiment as illustrated in FIG. 7, the interior channel wall is at a general 45 degree angle which begins approximately half way down a height of the water capture device 10. In other embodiments, the interior channel walls could be at different angles or be formed at multiple angles and have multiple sub-walls to maximize the volume for capturing the water. As also shown, the second interior channel wall 94 is generally vertically straight and intersect the respective first interior channel walls 92 to form the respective channel. In embodiments of the invention, the interior channel walls and overflow wall 96 may be one continuously curved surface with no angles, such as illustrated in FIG. 8.

In embodiments of the invention, a top end 82 of the first interior channel wall 92 and the second interior channel wall 94 and the overflow wall 96 do not extend to, touch, or otherwise intersect the top wall 40. Instead, the gap 88 is formed near a top of the cavity 42 of the body 26 between the top end 82 of the respective interior channel wall and the top wall 40. The gap 88 allows water to spill over from the main chamber 44 into the respective overflow channel 46. Embodiments of the invention are designed such that the overflow channels 46 occupy a minimal amount of interior volume of the body 26, which in turn maximizes the storage capacity of the water capture device 10. The gap 88 provides a benefit of cleaning the water capture device 10. As leaves, sticks, and other debris enters the water capture device 10 via the drainage system 14 and the input opening 54, they will typically float in the water in the main chamber 44. Upon the water level rising to the gap 88, the debris will be among the first things to spill over the gap 88 and into the overflow channel 46.

In embodiments of the invention, the filter sleeve 90 (as discussed above) may be utilized in the water capture device 10 using the crossing dual channels. In other embodiments of the invention (not illustrated), the top end 82 of the interior channel wall does extend to the top wall 40. In these embodiments, water enters the interior channel from the main chamber 44 via slits, openings or the like.

Turning to FIG. 7, the second overflow channel 50 extends from the right side of the body 26, across a width of the body 26. The second overflow channel 50 is fluidly connected with the second input opening 62 (i.e., the input opening 54 on the right side of the body 26). Similarly, the first overflow channel 48 extends from the left side 70 of the body 26, across the width of the body 26. The first overflow channel 48 is fluidly connected to the first input opening 60 (i.e. the input opening 54 on the left side 70 of the body 26). With the greater distance the overflow channel 46 extends across the body 26, comes a greater amount of exposure for debris floating on the surface of the water to spill over into the respective overflow channel 46. For example and referring to FIG. 7, the overflow wall 96 and interior channel wall 92, 94 for the respective overflow channels 46 runs a substantial width alongside the front wall 30. Even though this greater distance extending across the body 26 creates a greater amount of self-cleaning, the overflow channel 46 of other embodiments may only extend a slight distance across the width of the body 26.

In embodiments of the invention utilizing the tubular channel configuration or the dual overlapping channel configuration, one of the two overflow channels 46 will be utilized and one will not be utilized. Which is used is dependent upon whether the water capture device 10 is installed in the left configuration or the right configuration (discussed above). For the overflow channel 46 that is not being utilized, a return opening 98 (illustrated in FIGS. 7 and 8) may be utilized to return any water entering the unused overflow channel 46 into the main chamber 44. In essence, the return opening 98 makes the unused overflow channel 46 an addition to the main chamber 44. Water may accumulate in the unused overflow channel 46 just as it would in the main chamber 44 and the two will typically have a similar water level. The return opening 98 is an opening that may be selectively opened or removed at or near the bottom end 86 of the unused overflow channel 46 during the installation process.

In still of the embodiments of the invention, a single overflow channel 46 is utilized, such as illustrated in FIG. 9 (as opposed to the two overflow channels 46 as described above). This embodiment still has the first overflow opening 64 and second overflow opening 66 along the bottom wall 38. Similar to the embodiment of FIGS. 7 and 8, the overflow wall 96 of the embodiment of FIG. 9 presents the gap 88 between the overflow wall 96 and the top wall 40 to allow an excess water and debris to spill over the overflow wall 96 into the overflow channel 46. The overflow channel 46 then directs the water down to the bottom wall 38, where either the first overflow opening 64 or the second overflow opening 66 has been removed by the installer.

The plurality of openings 52 will now be discussed in greater detail. As illustrated in FIG. 1, the plurality of openings 52 may be fabricated to allow for easy removal during installation. For example, the openings 52 may be surrounded by a portion that is thinner than the surrounding material, to allow removal of unwanted material to form the respective opening. As another example, the openings 52 may be an openable gate. Prefabrication of the plurality of openings 52 allows for a variety of mounting and installation options according to the drainage system 14. As noted above, embodiments of the invention allow the water capture device 10 to be selectively positioned on the building 12. Depending on which orientation is chosen, an installer of the device will form the desired opening. Thus, for example, if the installer desires to install the device in the left orientation, the installer will form the first input opening 60 and the first overflow opening 64 (and the corresponding return opening 98, if applicable).

The operation of the water capture device 10 in a left alignment installation will now be discussed as an exemplary. Upon flowing down the drainage system 14 and into the first input opening 60, the water is directed towards the main chamber 44 of the water capture device 10. The water is then stored in the main chamber 44. As water accumulates in the main chamber 44, the main chamber 44 fills to capacity. Because the right return channel opening has been removed by the installer, the water simultaneously fills the second overflow channel 50. As the water capture device 10 nears capacity, the water level in the second overflow channel 50 rises to the gap 88. Upon the water level rising to flow over the gap 88, the water then flows into the first overflow channel 48. The water that has breached the gap 88 then travels down through the first overflow channel 48 and out the first overflow opening 64. The excess water is then overflowed into the overflow downspout of the drainage system 14 of the building 12 (or a separately installed drainage system). This prevents the water capture device 10 from retaining too much water in between uses of the water stored in the water capture device 10 by an operator. This also allows the water capture device 10 to be self-cleaning, such that floating debris will spill over and into the one or more overflow channels 46.

The release opening 58 and the utilization of the stored water will now be discussed in more detail. As discussed above, the water capture device 10 will collect and store water and may be distributed through the release opening 58. The release opening 58 is generally located in the main chamber 44 on the bottom wall 38. The release opening 58 allows complete (or substantially complete) drainage of the water stored in the main chamber 44. The release opening 58 is a void to allow water to drain out, however, it may be plugged by way of a release adapter 100. The release adapter 100 controls the flow through the release opening 58. Various release adapter 100s may be used, such as: a hose adapter, the spigot 24, a nozzle, a plumbing adapter, or a PVC piping adapter. In some embodiments, the release adapter 100 is located at a lower end of the release pipe 20. The release pipe 20 moves the release adapter 100 to a convenient height for utilization by the user. Typically, the release adapter 100 is disposed on the bottom wall 38 of the body 26 of the water capture device 10. The release adapter 100 may also be located at a lower end of the release pipe 20.

For example one embodiment of the water capture device 10 uses a garden hose adapter so that embodiments of the system may distribute the water to an irrigation system. Because embodiments of the water capture device 10 may be mounted on the side of the building 12 beyond reach of a person standing on the ground (as discussed above), it is advantageous to have the release adapter 100 adapt to a hose to allow a user to distribute the water from the water capture device 10 down to ground level. Moreover in certain embodiments of the system and method, a valve is installed near the ground level end of the hose to quickly access the stored water in the water capture device 10. The operator can then open the valve to allow the flow of water and close the valve to stop the flow of water.

Some embodiments of the invention further comprise a timer (not illustrated) that may control the flow of water through the release opening 58. The timer opens periodically, and/or remains open for a certain period of time. While the timer is open, water flows through the release opening 58 and to the irrigation system. The timer may be powered mechanically or electrically (e.g. battery powered, solar panel, or using the electrical system of the building 12)

In some embodiments, the release opening 58 and release adapter 100 allow water to be pumped back into the main chamber 44. For example, if there were a drought, embodiments of the system and method attach a hose from an external water source (e.g., a house's plumbing system), to the release opening 58 and release adapter 100 of the water capture device 10. Once connected, the external water source pumps water back up into the water capture device 10 through the release opening 58 and release adapter 100. Once the main chamber 44 of the water capture device 10 is full, excess water exits through the overflow opening 56. The operator may be alerted to the water capture device 10 being full by observing water overflow through the drainage system 14. Filling the water capture device 10 will then allow for the periodic or continual watering through the irrigation system without direct supervision by the operator.

In embodiments of the invention, the water capture device 10 includes one or more access ports 68 (as shown in FIG. 4). The access ports 68 is a void that is plugged by a gasket. The purpose of the one or more access ports 68 is to grant greater accessibility to the inside of the water capture device 10. In some embodiments the one or more access ports 68 will be latched. In other embodiments, the stopper may plug the void by being screwed into a threaded connection, which allows the one or more access ports 68 to be open and closed by rotating the stopper.

In embodiments of the invention, the access port 68 is be located on the bottom wall 38 of the housing in combination with the release opening 58 (as shown in FIG. 4). However, other embodiments of the water capture device 10 may have a removable top wall 40 as the access port 68. In still other embodiments, one or more access ports 68 are disposed on the front wall 30, left wall 34, right wall 36, top wall 40, or bottom wall 38 to grant greater access to the interior part of the water capture device 10. This allows greater access to hand wash the inside of the water capture device 10, form the return opening 98, remove debris, etc.

Some embodiment of the water capture device 10 may have a filter 102 installed internally (e.g., prior to fluid exiting the release opening 58) or externally (e.g., after the fluid leaves the opening). The filter 102 may include carbon, activated carbon, carbon block, granulated activated carbon, ceramic, deionization, mechanical filter 102, and a variety of other filters used for water filtration. Certain filters 102 may be used allow the water stored in the water capture device 10 to be potable. In embodiments of the water capture device 10 further includes external filters (not illustrated) that prevent debris from entering the water capture device 10.

The filter 102 may alternatively, or in addition, comprise a perforated tube 104. The perforated tube 104 provides a plurality of perforations 106 through which water may flow. The perforated tube 104 prevents any debris or sediment from clogging the release opening 58, or in some system embodiments, being distributed to an irrigation system. The perforated tube 104 may be removed and replaced by opening and closing the access port 68.

Some embodiments of the water capture device 10 may comprise a pump (not illustrated) to increase the water pressure through the release opening 58. The pump may be manually powered, electrically powered via a building electrical system, or electrically powered through a solar panel. The solar panel may be mounted to the exterior walls 28 of the water capture device 10, or may be located on the building 12.

As mentioned above, the water capture device 10 is mounted to the building 12, or may be self-supported next to the building 12. Embodiments of the water capture device 10 are mounted high on the building 12, near the top of the building 12 drainage system 14. The higher the water capture device 10 is above the ground, the more water pressure it has to distribute the fluid a greater distance. In fact, the water capture device 10 may be mounted beyond reach of a person standing on the ground. The water capture device 10, depending on the size, may store 20-50 gallons of water, 50-80 gallons of water, 80-150 gallons of water, or even more. As such, the water capture device 10 may weigh hundreds or thousands of pounds when filled with water. The water capture device 10 must therefore be securely mounted to the building 12 or a self-supporting apparatus.

Figure 10:
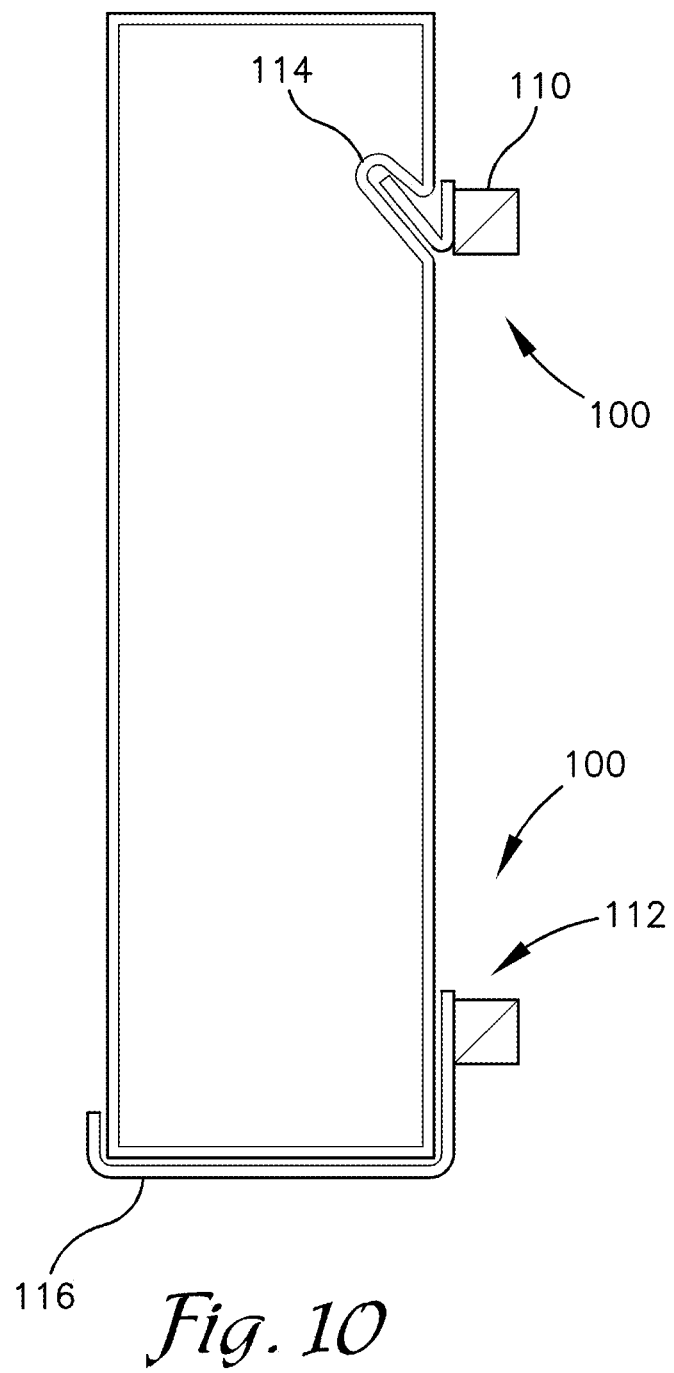
FIG. 10 is a side view illustrating a mounting bracket of the water capture device.

In embodiments of the invention as illustrated in FIG. 10, a mounting bracket 108 is utilized to mount the water capture device 10 to the building 12. The mounting bracket 108 may include an upper angle bracket 110 and a lower J-hook bracket 112. The upper angle bracket 110 interfaces with a slot 112 in the rear wall 32 of the water capture device 10. The lower J-hook bracket 112 includes a plurality of J-hooks 116 that are disposed around and under the bottom wall 38 of the water capture device 10. The upper angle bracket 110 supports a majority of the weight of the water capture device 10 and prevents rotational movements away from the building 12. The upper angle bracket 110 may be formed of an expandable box tube.

It should be appreciated that in many buildings 12 the mounting bracket 108 must be installed into studs or other reinforced sections. For this reason, the mounting bracket 108 is configured to receive fasteners or the like along a plurality of locations. For example, if the water capture device 10 is installed on a building 12 that is a standard dwelling, the water capture device 10 will need to be installed into stud boards of the building 12. This will provide the sufficient structural strength to support the water capture device 10. Because the water capture device 10 may be installed based upon the downspout 18 orientations, the stud board locations are relatively unpredictable in comparison to the downspout locations. For this reason, it is advantageous to allow the mounting bracket 108 to receive fasteners from a plurality of positions along the mounting bracket 108.

In other embodiments of the invention, the water capture device 10 is mounted and attached to the side of the building 12 utilizing another common structure, including using screws, bolts, brackets, braces, fasteners, latches, pins, etc. A further example allows the device to be mounted by way of screws that are received by mounting receptors (not shown in drawings), which are part of the along the edges of the embodiment. As the mounting receptors receive screws, the screws continue into the side of the building 12 and support the embodiment.

In other embodiments of the invention, the water capture device 10 is installed atop a scaffolding (not illustrated) to support the weight of the water capture device 10. In still other embodiments, the water capture device 10 may be suspended by cabling or may sit on shelving that is attached to the side of the building 12. The water capture device 10 may be originally constructed at least partially inside the building 12, to reduce the weight hanging from the side of the building 12.

The rear wall 32 has a shape that is complementary to the shape of the building 12 to which it is mounted. The complementary shape allows the water capture device 10 to remain flush against the side of the building 12. Generally, the complementary shape is substantially flat, but could be curved or another shape to fit flush against a curved wall. The other exterior walls 28 of the water capture device 10 will have additional straight sides and be rectangular in shape so as to mimic the look of the building 12.

In embodiments of the invention, the exterior surfaces of the plurality of exterior walls 28 of the water capture device 10 may mimic the look of the building 12. Such modifications may include, for example, painting the exterior surface and/or covering the exterior surface with stucco, paneling, siding, bricks, metal, glass, stone, etc. In this way, the water capture device 10 may blend into the building 12 and not be readily apparent to an observer. This may be advantageous for aesthetic reasons. In these embodiments, the installer may select an appropriate covering for the walls of the water capture device 10 and install it thereon. In other embodiments, the installer may remove a portion of the coverings from the building 12 and install them on the water capture device 10. For example, if the building 12 has vinyl siding, the installer may remove a portion of the vinyl siding, install the water capture device 10 directly against the building 12, and install the removed vinyl siding on the front wall 30 of the water capture device 10, such that the water capture device 10 appears to be an extension of the building 12.

In embodiments of the invention, the water capture device 10 is installed within the building 12. Water from the input downspout 18 may be directed into the building 12 (i.e. through an exterior wall of the building 12) and into the water capture device 10. Water exiting the water capture device 10 (both via the overflow downspout and the release opening 58) are directed out of the building 12 (i.e. through an exterior wall of the building 12) to be disposed of or utilized outside of the building 12. In some embodiments of the invention, the release opening 58 may remain within the building 12. This allows the water to be utilized for various purposes, such as drinking. This embodiment may be advantageous because it allows for larger water capture devices 10 because the interior of a building 12 may be able to support a larger water capture device 10 than hanging from the exterior.

Although the invention has been described with reference to the embodiments illustrated in the attached drawing figures, it is noted that equivalents may be employed and substitutions made herein without departing from the scope of the invention.

Having thus described various embodiments of the invention, what is claimed as new and desired to be protected by Letters Patent includes the following:

The invention claimed is:

1. A water capture device comprising:
   a plurality of exterior walls defining a cavity;
   a first input opening disposed toward a first side of the cavity for allowing water to enter the cavity;
   a second input opening disposed toward a second side of the cavity for allowing water to enter the cavity;
   a main chamber within the cavity configured to fill with water;
   a release opening for selectively releasing water from the main chamber for use by a user,
   wherein the release opening is disposed on a bottom wall of the plurality of exterior walls such that the water capture device can fully drain,
   wherein the release opening includes a perforated tube for filtering the water that is released through the release opening;
   a first overflow channel within the cavity and disposed toward the first side of the cavity for receiving excess water from the main chamber that rises above a threshold associated with the first overflow channel;
   a second overflow channel within the cavity and disposed toward the second side of the cavity,
   said second overflow channel including a return opening in fluid communication with the main chamber such that a water level is constant within both the main chamber and the second overflow channel; and
   a first overflow opening for allowing water within the first overflow channel to freely exit the water capture device.

2. The water capture device of claim 1,
   wherein each of the first input opening and the second input opening is configured to interface with an input downspout of a drainage system of a building,
   wherein the first overflow opening is configured to interface with an overflow downspout of the drainage system of the building.

3. The water capture device of claim 1, wherein the first overflow opening is disposed toward the first side of the water capture device.

4. The water capture device of claim 3,
   wherein the water capture device is configured to be installed in either of a second configuration or a first configuration,
   wherein the second configuration is characterized by an input downspout interfacing with the first input opening and an overflow downspout interfacing with the first overflow opening,
   wherein the first configuration is characterized by the input downspout interfacing with the second input opening and the overflow downspout interfacing with the second overflow opening.

5. The water capture device of claim 4,
   wherein the return opening of the second overflow channel within the cavity is configured to be selectively opened if the water capture device is installed in the first configuration.

6. The water capture device of claim 1,
   wherein the release opening includes an access port that allows for access into the cavity.

7. The water capture device of claim 6, wherein the plurality of exterior walls includes
   a rear wall,
   wherein the rear wall includes a slot for receiving an angle bracket of a mounting bracket.

8. The water capture device of claim 1, further comprising:
   a mounting bracket configured to be installed in an elevated location on the building,
   wherein the water capture device is configured to be secured to the mounting bracket.

9. The water capture device of claim 1, further comprising:
   a filter sleeve secured to the first input opening and directed toward the first overflow channel,
   wherein the filter sleeve directs incoming debris from the first input opening toward the first overflow channel,
   wherein the filter sleeve is configured to allow at least a portion of the incoming water to fall into the main chamber.

10. A water capture device configured to be installed on a drainage system of a building, the water capture device comprising:
- a plurality of exterior walls defining a cavity;
- a first input opening for allowing water to enter the cavity;
- a main chamber within the cavity configured to fill with water;
- a first overflow channel within the cavity and for receiving excess water from the main chamber that rises above a threshold associated with the first overflow channel
- wherein the water capture device retains the received water within the main chamber for later use; and
- a filter sleeve secured to the first input opening and directed toward the first overflow channel,
- wherein the filter sleeve directs incoming debris from the first input opening toward the first overflow channel,
- wherein the filter sleeve is configured to allow at least a portion of the incoming water to fall into the main chamber,
- wherein the first input opening is vertically offset from the first overflow channel such that water which permeates the filter sleeve does not fall into the first overflow channel.

11. The water capture device of claim 10, wherein the drainage system is already associated with the building prior to installation of the water capture device.

12. The water capture device of claim 10, wherein the water capture device is configured so as to be installed in a second configuration or a first configuration,
- wherein in the second configuration an input downspout of the drainage system interfaces with the first input opening of the water capture device and an overflow downspout of the drainage system interfaces with a first overflow opening of the water capture device,
- wherein in the first configuration the input downspout of the drainage system interfaces with a second input opening of the water capture device and the overflow downspout of the drainage system interfaces with a second overflow opening of the water capture device.

13. The water capture device of claim 12, wherein the first input opening, the first overflow opening, the second input opening, and the second overflow opening are configured to be selectively formed based upon whether the water capture device is to be installed in the second configuration or the first configuration.

14. The water capture device of claim 10, wherein the water capture device is configured to be selectively filled with water via an external water source being connected to a release pipe.

15. A method of collecting and utilizing water, the method comprising the following steps:
- installing a water capture device in an elevated location on a building,
- wherein the water capture device includes a main chamber for storing water for later use,
- wherein the water capture device is configured so as to be installed in a second configuration or a first configuration,
- wherein in the second configuration an input downspout interfaces with a first input opening of the water capture device and an overflow downspout interfaces with a first overflow opening of the water capture device,
- wherein in the first configuration the input downspout interfaces with a second input opening of the water capture device and the overflow downspout interfaces with a second overflow opening of the water capture device;
- directing water into the water capture device via a drainage system of the building;
- directing overflow water that exceeds a storage capacity of the main chamber from the water capture device to continue to drain from the building; and
- providing a release pipe such that a user may selectively utilize water stored in the main chamber of the water capture device from a position lower than the elevated location on the building.

16. The method of claim 15, wherein the drainage system of the building is previously existing.

17. The method of claim 15, further including the follow steps:
- removing a segment of a downspout of the drainage system being of a length substantially similar to a height presented by the water capture device,
- wherein upon removal, the downspout presents the input downspout and the overflow downspout; and
- emplacing the water capture device between the input downspout and the overflow downspout.

18. The method of claim 15, wherein the first input opening, the first overflow opening, the second input opening, and the second overflow opening are configured to be selectively formed based upon whether the water capture device is to be installed in the second configuration or the first configuration.

* * * * *